US012767885B2

(12) United States Patent
Zhou

(10) Patent No.: US 12,767,885 B2
(45) Date of Patent: Oct. 20, 2026

(54) QUANTUM DOT, PREPARATION METHOD THEREOF, AND QUANTUM DOT FILM

(71) Applicant: SHENZHEN CHINA STAR OPTOELECTRONICS SEMICONDUCTOR DISPLAY TECHNOLOGY CO., LTD., Shenzhen (CN)

(72) Inventor: Miao Zhou, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 1314 days.

(21) Appl. No.: 17/623,163

(22) PCT Filed: Dec. 17, 2021

(86) PCT No.: PCT/CN2021/139245

§ 371 (c)(1),
(2) Date: Jun. 15, 2023

(87) PCT Pub. No.: WO2023/103046

PCT Pub. Date: Jun. 15, 2023

(65) Prior Publication Data

US 2024/0043743 A1 Feb. 8, 2024

(30) Foreign Application Priority Data

Dec. 10, 2021 (CN) ......................... 202111509569.7

(51) Int. Cl.
*C09K 11/58* (2006.01)
*C09K 11/02* (2006.01)

(52) U.S. Cl.
CPC .............. *C09K 11/58* (2013.01); *C09K 11/02* (2013.01)

(58) Field of Classification Search
CPC ...... C09K 11/02; C09K 11/0805–0816; C09K 11/0883; C09K 11/56–565; C09K 11/58; C09K 11/62–625
See application file for complete search history.

(56) References Cited

U.S. PATENT DOCUMENTS

2021/0024356 A1 1/2021 Cheng et al.

FOREIGN PATENT DOCUMENTS

CN 102398043 A 4/2012
CN 103952136 A 7/2014
(Continued)

OTHER PUBLICATIONS

Sun. Synthesis and Optical Properties of Nanorattles and Multiple-Walled Nanoshells/Nanotubes Made of Metal Alloys. J. Am. Chem. Soc. 2004, 126, 9399-9406 (Year: 2004).*
(Continued)

*Primary Examiner* — Matthew E. Hoban
(74) *Attorney, Agent, or Firm* — PV IP PC; Peter Stecher; Wei Te Chung

(57) ABSTRACT

The present application relates to a quantum dot, a preparation method thereof, and a quantum dot film. The quantum dot of the present invention includes a quantum dot core and a metal shell, and a hollow ring is formed between an inner wall of the metal shell and an outer wall of the quantum dot core. The present invention prevents the use of a transition shell such as SiO2 in the prior art to ensure a spacing between the quantum dot core and the metal shell; prevents the ligand modification of quantum dots, thereby preventing
(Continued)

reduction of fluorescence efficiency of the quantum dot, thus maintaining an original light conversion efficiency of the quantum dot.

14 Claims, 3 Drawing Sheets

(56) References Cited

FOREIGN PATENT DOCUMENTS

| | | | | | |
|---|---|---|---|---|---|
| CN | 106910907 A | * | 6/2017 | ............ | H01M 4/925 |
| CN | 109929549 A | | 6/2019 | | |
| CN | 110951477 A | | 4/2020 | | |
| CN | 113600826 A | | 11/2021 | | |
| WO | WO-2021261334 A1 | * | 12/2021 | ........... | G01N 33/533 |

OTHER PUBLICATIONS

«Preparation and application of hollow-structured micro-nano materials» First Edition Dec. 31, 2013 p. 84 Jiu hong fang National Defense Industry Press.
«Chem. Mater.» vol. 30 Dec. 22, 2017 p. 775-780 Sandip K. Pahari et al. Magneto-Fluorescent Yolk-Shell Nanoparticles.
International Search Report in International application No. PCT/CN2021/139245,mailed on Sep. 7, 2022.
Written Opinion of the International Search Authority in International application No. PCT/CN2021/139245,mailed on Sep. 7, 2022.
Chinese Office Action issued in corresponding Chinese Patent Application No. 202111509569.7 dated Jun. 22, 2022, pp. 1-18.

* cited by examiner

QUANTUM DOT, PREPARATION METHOD THEREOF, AND QUANTUM DOT FILM

BACKGROUND OF INVENTION

Field of Invention

The present application relates to the technical field of quantum dots, in particular to a quantum dot and a preparation method thereof.

Description of Prior Art

Quantum dots (QD) are a nano-scaled semiconductor. Quantum dots have the characteristics of narrow emission spectrum, size-controlled fluorescence color, high color gamut, and wide viewing angles, and are widely used in display technology products. Backlight technology with miniature light-emitting diode (mini-LED), micron light-emitting diode (Micro-LED), and organic light-emitting diode (OLED), can exhibit excellent display quality, which is the most competitive display product in the future.

At present, a development trend of quantum dots is to enhance reliability of quantum dots. At present, a surface of the quantum dot core is mainly coated with a variety of shell structures, such as $SiO_2$, PS, etc., to barrier an erosion of the quantum dot core by water and oxygen. Such coating methods require ligand modification on the surface of the quantum dots, and the modification process will significantly reduce the fluorescence efficiency of the quantum dots.

At present, another development trend of quantum dots is to improve the light absorption efficiency and light conversion efficiency of quantum dots. Currently, scattering particles are mainly added to quantum dots to improve the light absorption efficiency of the quantum dot film, or the surface of the quantum dot core is coated with a metal shell. However, before encapsulating the metal shell layer, it is generally necessary to pre-encapsulate a transition shell layer such as $SiO_2$ to separate a surface of the quantum dot core from the metal shell layer to prevent quenching of the quantum dots caused by plasmon resonance. Since this approach also needs to perform pre-coating of $SiO_2$, a surface of the quantum dots needs to be modified with ligands, and the modification process will significantly reduce a fluorescence efficiency of the quantum dots.

SUMMARY OF INVENTION

An object of the present invention is to provide a quantum dot, a preparation method thereof, and a quantum dot film, which can solve the existing technical problems of low fluorescence efficiency of the quantum dots caused by ligand modification of the surface of the quantum dots when a transition shell layer is required to encapsulate a surface of the quantum dots to improve reliability, light absorption efficiency, and light conversion efficiency of quantum dots.

In order to solve the above problems, the present invention provides a quantum dot core; and a metal shell encapsulating the quantum dot core, wherein a hollow ring is defined between an inner wall of the metal shell and an outer wall of the quantum dot core.

Further, a diameter of the outer wall of the metal shell ranges from 100 nm to 150 nm.

Further, a thickness of the hollow ring ranges from 10 nm to 50 nm.

Further, the quantum dot further includes: an inorganic shell located between the quantum dot core and the hollow ring.

In order to solve the above problems, the present invention provides a method of preparing quantum dots, which includes the following steps: providing a quantum dot core; and providing a metal shell to encapsulate an outer wall of the quantum dot core, wherein a hollow ring is defined between an inner wall of the metal shell and the outer wall of the quantum dot core.

Further, the step of providing the metal shell to encapsulate the outer wall of the quantum dot core includes: adding the quantum dot core and a first solution into a first container, vacuuming the first container, and then adding an inert gas into the first container, followed by stirring to form a uniform second solution; heating the first container, adding a third solution containing first metal ions to the first container for reaction, cooling the first container, and performing a first purification treatment to obtain a first extract; adding a fourth solution to the first extract, followed by stirring; and adding a fifth solution containing second metal ions to the first extract, followed by stirring, subjecting the first metal ions and the second metal ions to a substitution reaction, followed by stirring, and performing a second purification treatment to obtain a second extract, so that the outer wall of the quantum dot core is encapsulated by a metal layer to form the metal shell, to define the hollow ring between the inner wall of the metal shell and the outer wall of the quantum dot core.

Further, the first solution includes one or more of organic amines, organic acids, trioctyl phosphorus, alkanes with a boiling point higher than 300° C., and alkenes with a boiling point higher than 300° C.

Further, each of the third solution and the fourth solution includes one of oleylamine, toluene, DMF, and organic amines with a boiling point higher than 300° C.

Further, each of the fourth solution and the fifth solution further includes cetyltrimethylammonium bromide, and a concentration of the cetyltrimethylammonium bromide in the fourth solution ranges from 0.02 mmol/ml to 0.08 mmol/ml.

Further, an activity of the first metal ions is greater than an activity of the second metal ions; and a content of the second metal ions in the fifth solution is greater than a content of the first metal ions in the third solution.

In order to solve the above-mentioned problems, the present invention provides a quantum dot film including the quantum dots involved in the present invention.

The present invention utilizes the Kirkendall effect to coat a metal shell on the periphery of the quantum dot core, and a hollow ring is formed between the inner wall of the metal shell and the outer wall of the quantum dot core. The present invention prevents the use of a transition shell such as $SiO_2$ in the prior art to ensure a spacing between the quantum dot core and the metal shell; prevents the ligand modification of quantum dots, thereby preventing reduction of fluorescence efficiency of the quantum dot, thus maintaining an original light conversion efficiency of the quantum dot.

The quantum dot of the present invention can be modified with ligands to its metal shell, and thus can be subjected to more subsequent processes. The subsequent processes have no effect on the quantum dot core, which can ensure that the optical properties of the quantum dot are not destroyed while enriching applicability the quantum dot. A surface plasmon resonance effect of the metal shell is used to enhance a light absorption efficiency of the quantum dots, improve the optical utilization rate of the quantum dots, and improve the luminous brightness of the quantum dots. Compactness of the metal shell is utilized to effectively block permeation of water and oxygen.

BRIEF DESCRIPTION OF DRAWINGS

In order to more clearly illustrate the technical solutions of the embodiments of the application, the drawings illustrating the embodiments will be briefly described below. Obviously, the drawings in the following description merely illustrate some embodiments of the present invention. Other drawings may also be obtained by those skilled in the art according to these figures without paying creative work.

Figure 1:
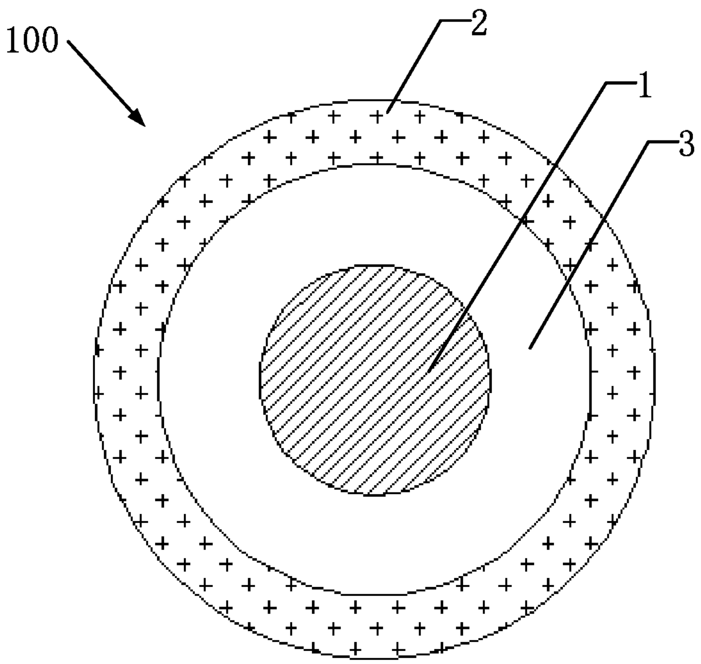
FIG. 1 is a schematic structural diagram of a quantum dot according to Embodiment 1 of the present invention.

Elements in the drawings are designated by reference numerals listed below.

100. quantum dot;

1. quantum dot core; 2. metal shell

3. hollow ring; 4. metal transition shell;

5. inorganic shell.

DETAILED DESCRIPTION OF PREFERRED EMBODIMENTS

The preferred embodiments of the present invention are described in detail below with reference to the accompanying drawings, in which FIG. Those skilled in the art will more readily understand how to implement the invention. The present invention may, however, be embodied in many different forms and embodiments, and the scope of the invention is not limited to the embodiments described herein.

The following description of the various embodiments is provided to illustrate the specific embodiments of the invention. The spatially relative directional terms mentioned in the present invention, such as “upper”, “lower”, “before”, “after”, “left”, “right”, “inside”, “outside”, “side”, etc. and the like, may be used herein for ease of description to describe one element or feature’s relationship to another element(s) or feature(s) as illustrated in the figures which are merely references.

In the drawings, the spatially relative terms are intended to encompass different orientations in addition to the orientation as depicted in the figures. Moreover, the size and thickness of each component shown in the drawings are arbitrarily shown for ease of understanding and description, and the invention does not limit the size and thickness of each component.

The present invention provides a quantum dot film, which includes a quantum dot 100. The quantum dot film may be a quantum dot color filter, combined with backlight technologies such as a blue OLED, a Mini-LED, or a Micro-LED, and applied to high-color gamut display products. The quantum dot film may be a quantum dot light-emitting layer, which is used in high color gamut display products. The quantum dot film can also be used in a backlight module, in conjunction with an LCD display screen to improve a color gamut of the liquid crystal display panel.

Embodiment 1

As shown in FIG. 1, this embodiment provides a quantum dot 100. The quantum dot 100 includes a quantum dot core 1 and a metal shell 2.

The quantum dot core 1 can be classified into a red quantum dot core and a green quantum dot core. A material of the red quantum dot core includes: one of CdSe, $Cd_2SeTe$, and InAs; and a material of the green quantum dot core includes: one of $ZnCdSe_2$, InP, and $Cd_2SSe$. In this embodiment, the material of the quantum dot core 1 is CdSe. A diameter of the quantum dot core 1 ranges from 1 nm to 10 nm.

The metal shell 2 encapsulates the quantum dot core 1. A material of the metal shell 2 includes one or more of Ag, $AgSiO_2$, $AgTiO_2$, AgPS, AgPMMA, and AgPE. In this embodiment, a material of the metal shell 2 is Ag, and an absorption peak of Ag ranges from 430 nm to 500 nm. A diameter of an outer wall of the metal shell 2 ranges from 100 nm to 150 nm. A surface plasmon resonance effect of the metal shell 2 is used to enhance a light absorption efficiency of the quantum dot 100, increase an optical utilization rate of the quantum dot 100, and increase the light-emitting brightness of the quantum dot 100. Compactness of the metal shell 2 is used to effectively block permeation of water and oxygen.

A hollow ring 3 is formed between the inner wall of the metal shell 2 and the outer wall of the quantum dot core 1. A thickness of the hollow ring 3 ranges from nm to 50 nm.

In this embodiment, a metal shell 2 is coated on the periphery of the quantum dot core 1, and a hollow ring 3 is formed between the inner wall of the metal shell 2 and the outer wall of the quantum dot core 1. This embodiment prevents the use of a transition shell such as $SiO_2$ in the prior art to ensure a spacing between the quantum dot core and the metal shell; prevents the ligand modification of quantum dots, thereby preventing reduction of fluorescence efficiency of the quantum dot 100, thus maintaining an original light conversion efficiency of the quantum dot 100.

The quantum dot 100 of this embodiment can be modified with ligand to its metal shell 2 so that more subsequent processing can be performed on the quantum dot 100. The subsequent manufacturing process has no effect on the quantum dot core 1, which can ensure that the optical properties of the quantum dot are not destroyed while enriching applicability the quantum dot.

Figure 2:
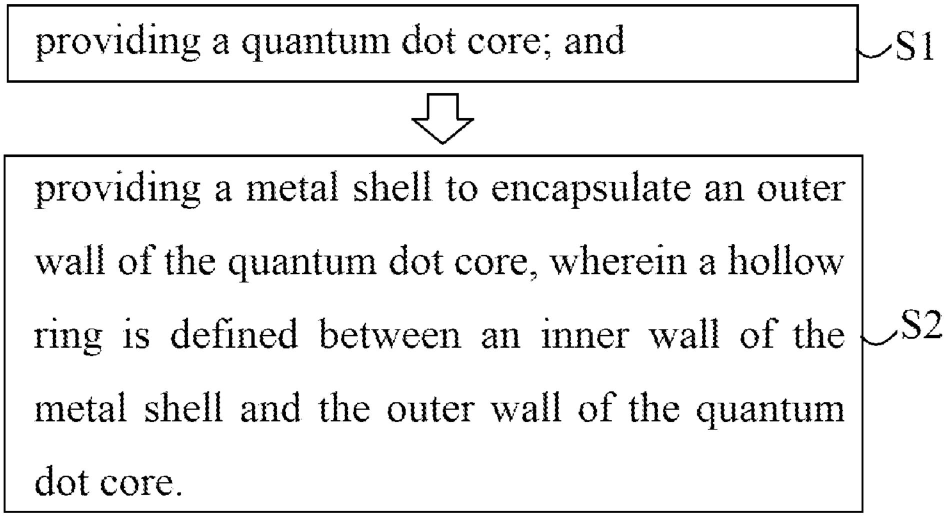
FIG. 2 is a flow chart of steps of preparing the quantum dot according to Embodiment 1 of the present invention.

As shown in FIG. 2, this embodiment also provides a method of preparing the quantum dot 100 of this embodiment, which includes the following steps: S1, providing a quantum dot core 1; S2, providing a metal shell 2 to encapsulate an outer wall of the quantum dot core 1; wherein a hollow ring 3 is formed between the inner wall of the metal shell 2 and the outer wall of the quantum dot core 1.

The step S2 includes: adding the quantum dot core 1 with a content of cations of 0.01 mmol to 0.05 mmol and 15 ml-25 ml of the first solution into a first container, vacuuming the first container at a temperature of 70° C.-90° C., and then adding an inert gas into the first container, followed by stirring to form a uniform second solution; heating the first container to 300° C.-350° C., adding 0.5 ml-5 ml of a third solution with a content of first metal ions of 0.01 mmol to 0.05 mmol at a speed of to the first container for reaction for 3 min-5 min, cooling the first container to room temperature, and performing a first purification treatment to obtain a first extract; adding 15 ml-30 ml of a fourth solution to the first extract, followed by stirring at room temperature for 3 min-8 min; and adding 0.5 ml-5 ml of a fifth solution with a content of second metal ions of 0.005 mmol-0.06 mmol at a speed of 0.03 ml/s-0.05 ml/s to the first extract, followed by stirring at room temperature, subjecting the first metal ions and the second metal ions to a substitution reaction, followed by stirring for 5 min-10 min, and performing a second purification treatment to obtain a second extract, so that the outer wall of the quantum dot core 1 is encapsulated by a metal layer to form the metal shell 2, to define the hollow ring 3 between the inner wall of the metal shell 2 and the outer wall of the quantum dot core 1.

The first solution includes one or more of organic amines, organic acids, trioctyl phosphorus, alkanes with a boiling point higher than 300° C., and alkenes with a boiling point higher than 300° C.

The organic amines include octylamine, dodecylamine, and organic amines with a boiling point higher than 300° C. The organic amines with a boiling point higher than 300° C. include: linear alkyl amines with not less than 16 carbon atoms (hexadecylamine, stearylamine, eicosamine), and linear alkenyl amines with not less than 16 carbon atoms (oleylamine, eicoseneamine, etc.).

The organic acids include oleic acid, octadecanoic acid, and the like.

The alkanes with a boiling point higher than 300° C. include linear alkanes with not less than 18 carbon atoms, and linear alkanes with not less than 25 carbon atoms (squalane, etc.). When the first solution uses alkane with a boiling point higher than 300° C., it needs to be used in conjunction with 3 ml-10 ml of organic amines.

The olefins with a boiling point higher than 300° C. include linear olefins (octadecene, octadecane). When the first solution uses an olefin with a boiling point higher than 300° C., it needs to be used in conjunction with 3 ml-10 ml of organic amines.

Each of the third solution and the fourth solution includes one of oleylamine, toluene, DMF, and organic amines with a boiling point higher than 300° C.

Each of the fourth solution and the fifth solution further includes cetyl trimethyl ammonium bromide, and a concentration of the cetyl trimethyl ammonium bromide in the fourth solution ranges from 0.02 mmol/ml to 0.08 mmol/ml.

An activity of the first metal ions is greater than an activity of the second metal ion; a content of the second metal ions in the fifth solution is greater than a content of the first metal ions in the third solution content. Preferably, a content of the second metal ions in the fifth solution is 1-1.2 times the content of the first metal ions in the third solution.

In this embodiment, the step S2 includes: adding the quantum dot core 1 with a content of cations ($Cd_2$+) of 0.025 mmol and 20 ml of the first solution (a mixture of 19 ml of octadecylamine and 1 ml of TOP) into a three-necked flask, vacuuming the first container at a temperature of 80° C., and then adding an inert gas ($N_2$) into the three-necked flask, followed by stirring to form a uniform second solution; heating the first container to 300° C., adding 2 ml of the third solution (a mixed solution of CuCl and oleylamine) with a content of first metal ions (Cu+) of 0.02 mmol to the three-necked flask at a speed of 0.035 ml/s for reaction for 4 min, cooling the three-necked flask to room temperature, and performing a first purification treatment to obtain a first extract.

It should be noted that the third solution (a mixed solution of CuCl and oleylamine) needs to be injected slowly at high temperature, otherwise there will be a side reaction of formation of individual Cu particles, which will impact the Cu shell coating on the periphery of the quantum dot core.

Figure 3:
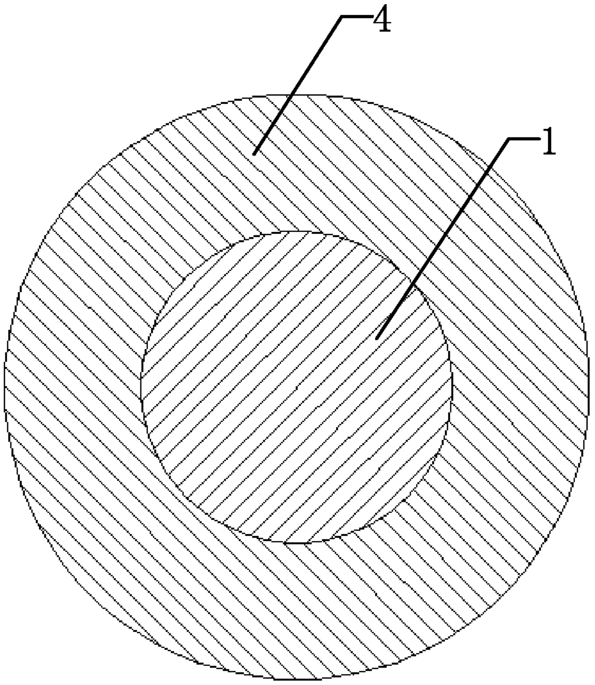
FIG. 3 is a schematic structural diagram of a quantum dot core coated with a metal transition shell according to Embodiment 1 of the present invention.

As shown in FIG. 3, the first purification treatment includes: transferring the Cu-coated reaction solution to a separatory funnel, adding 5 ml of n-hexane; after mixing uniformly, gradually adding excess methanol to disperse particles at an upper layer of n-hexane, wherein colorless methanol mixtures are present at a lower layer of n-hexane; after removing the methanol at the lower layer of n-hexane, adding excess methanol again, repeating the above processes 3 times, transferring the upper layer of n-hexane to a centrifuge tube, and adding excess acetone (a volume ratio of acetone to n-hexane is 3:7), and a turbid liquid appears after fully mixing; centrifuging at 4500 rpm for 10 min, removing the supernatant, and obtaining a particle precipitate of the metal transition shell 4 coated on the periphery of the quantum dot core 1. Specifically, the metal transition shell 4 is a Cu shell, and the particles are QDCu particles.

In this embodiment, the step S2 also includes: adding 25 ml of the fourth solution (a mixed solution of CTAB and oleylamine, where the concentration of CTAB is 0.05 mmol/ml) to the first extract, followed by stirring at room temperature for 5 min; and adding 2 ml of the fifth solution (a mixture of AgCl and CTAB) with a content of second metal ions of 0.02 mmol to the first extract at a speed of 0.4 ml/s, followed by stirring at room temperature, subjecting the first metal ions (Cu+) and the second metal ions (Ag+) to a substitution reaction, followed by stirring for 10 min, and performing a second purification treatment to obtain a second extract, so that the outer wall of the quantum dot core 1 is encapsulated by a metal layer to form the metal shell 2, to define the hollow ring 3 between the inner wall of the metal shell 2 and the outer wall of the quantum dot core 1.

It should be noted that the fifth solution (a mixture of AgCl and CTAB) needs to be injected quickly at room temperature. At this time, the temperature is low and Ag particles will not be formed individually. The rapid injection is beneficial to the formation of the hollow ring 3.

As shown in FIG. 1, the second purification treatment includes: transferring the Ag-coated reaction solution to a centrifuge tube, and centrifuging at a centrifuge speed of 9000 rpm for 10 minutes to obtain precipitated particles of the metal shell 2 coated on the periphery of the quantum dot core 1, wherein the inner wall of the metal shell 2 and the outer wall of the quantum dot core 1 define the hollow ring 3. In other embodiments, a small amount of acetone can be added in the second purification process to assist the purification process.

The principle of the Kirkendall effect is that two metals with different diffusion rates will form defects during their diffusion process, which is very typical in a substitution process. During the reaction, the inner layer metal continues to diffuse to the outer layer, and a total number of lattice points remains unchanged, and every plane in the diffusion area must move.

In this embodiment, cuprous chloride (CuCl) is used as a reactant, and a Cu shell is coated on the quantum dot core 1 as the metal transition shell 4; the metal substitution reaction is carried out with AgCl as a reactant and CTAB as an auxiliary ligand, a small amount of octylamine is added, and with the Cu shell as a template, the Kirkendall effect is utilized to form the metal shell 2 and the hollow ring 3 between the inner wall of the metal shell 2 and the outer wall of the quantum dot core 1. A diameter of the outer wall of the hollow ring 3 is equal to a diameter of the outer wall of the Cu shell. A diameter of the outer wall of the hollow ring 3 is related to the diameter of the outer wall of the Cu shell. Ag and Cu are substituted one-to-one, and the amounts of substances are the same, so that the thickness of the formed metal shell 2 is related to the Cu content.

Principle of metal surface plasmon resonance enhanced QD fluorescence is that: a density of an electron cloud on the metal surface is relatively large, and when the light is transmitted to a surface of the metal ion, it resonates with the electron cloud, and a secondary energy can be transferred to a quantum dot material, which is absorbed by the quantum dot and converted into fluorescence of a specific wavelength, wherein a fluorescence color is related to a band gap of the quantum dot itself, which will not change a fluorescence emission wavelength of the quantum dot itself, but will increase light absorption efficiency, so that under excitation of the same blue light intensity, a conversion brightness of QDAg is greatly improved. Such an enhancement effect of this phenomenon is related to a diameter of the outer wall of the metal shell 2 and a distance between the inner wall of the metal shell 2 and the outer wall of the quantum dot core 1. The diameter of the outer wall of the metal shell 2 affects a wavelength of the excitation light absorbed by the metal shell. Therefore, in this embodiment, it is preferred that a characteristic absorption peak of the Ag metal shell is at 430-500 nm, and the diameter of the outer wall of the metal shell 2 ranges from 100 nm to 150 nm. The distance between the inner wall of the metal shell 2 and the outer wall of the quantum dot core 1 affects the fluorescence enhancement characteristics, and the distance between the inner wall of the metal shell 2 and the outer wall of the quantum dot core 1 ranges from 10-5 nm.

This embodiment utilizes the Kirkendall effect to coat a metal shell 2 on the periphery of the quantum dot core 1, and a hollow ring 3 is formed between the inner wall of the metal shell 2 and the outer wall of the quantum dot core 1. This embodiment prevents the use of a transition shell such as $SiO_2$ in the prior art to ensure a spacing between the quantum dot core and the metal shell; prevents the ligand modification of quantum dots, thereby preventing reduction of fluorescence efficiency of the quantum dot 100, thus maintaining an original light conversion efficiency of the quantum dot 100.

The quantum dot 100 of this embodiment can be modified with ligand to its metal shell 2, so that more subsequent processing can be performed on the quantum dot 100. The subsequent manufacturing process has no effect on the quantum dot core 1, which can ensure that the optical properties of the quantum dot 100 are not destroyed while enriching applicability the quantum dot 100.

Embodiment 2

Figure 4:
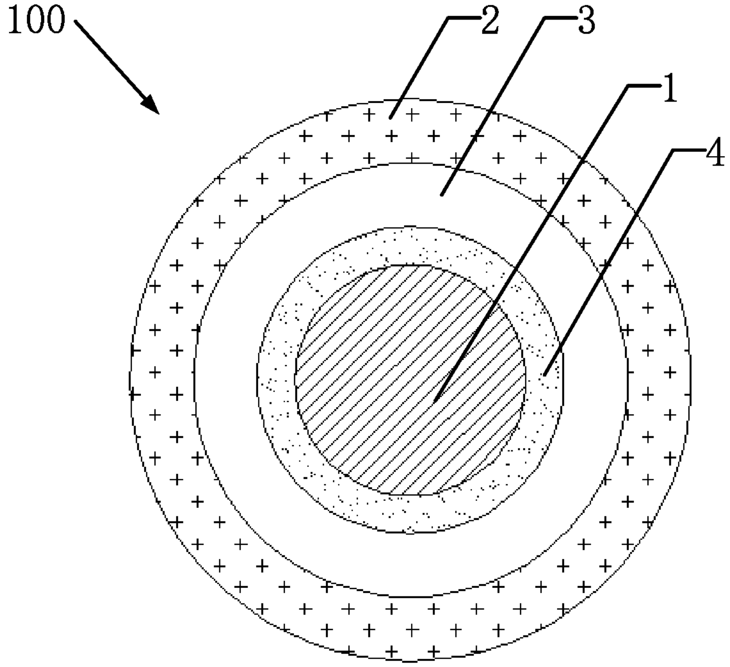
FIG. 4 is a schematic structural diagram of a quantum dot according to Embodiment 2 of the present invention.

As shown in FIG. 4, this embodiment provides a quantum dot 100. The quantum dot 100 includes a quantum dot core 1, an inorganic shell 5, and a metal shell 2.

The quantum dot core 1 can be classified into a red quantum dot core and a green quantum dot core. A material of the red quantum dot core includes: one of CdSe, $Cd_2SeTe$, and InAs; and a material of the green quantum dot core includes: one of $ZnCdSe_2$, InP, and $Cd_2SSe$. In this embodiment, the material of the quantum dot core 1 is CdSe. A diameter of the quantum dot core 1 ranges from 1 nm to 10 nm.

The inorganic shell 5 is coated on the outer wall of the quantum dot core 1. A material of the inorganic shell 5 is a wide band gap material, and the wide band gap material includes one or more of CdS, ZnSe, $ZnCdS_2$, ZnS, and ZnO. In this embodiment, the material of the inorganic shell 5 is ZnS. A thickness of the inorganic shell 5 ranges from 0.5 nm to 10 nm. By encapsulating the outer wall of the quantum dot core 1 with the inorganic shell 5, the reliability of the quantum dot 100 and the light conversion efficiency of the quantum dot 100 can be improved without changing the light-emitting color of the quantum dot 100.

At present, in order to improve the light conversion efficiency and dispersibility of the quantum dot 100, an organic molecular layer (not shown) is generally coated on the periphery of the inorganic shell 5.

The metal shell 2 encapsulates the inorganic shell 5. A material of the metal shell 2 includes one or more of Ag, $AgSiO_2$, $AgTiO_2$, AgPS, AgPMMA, and AgPE. In this embodiment, a material of the metal shell 2 is Ag, and an absorption peak of Ag ranges from 430 nm to 500 nm. A diameter of an outer wall of the metal shell 2 ranges from 100 nm to 150 nm. A surface plasmon resonance effect of the metal shell 2 is used to enhance a light absorption efficiency of the quantum dot 100, increase an optical utilization rate of the quantum dot 100, and increase the light-emitting brightness of the quantum dot 100. Compactness of the metal shell 2 is used to effectively block permeation of water and oxygen.

The inner wall of the metal shell 2 and the outer wall of the inorganic shell define a hollow ring 3. A thickness of the hollow ring 3 ranges from 10 nm to 50 nm.

In this embodiment, an inorganic shell 5 is coated on the periphery of the quantum dot core 1, and a metal shell 2 is coated on the periphery of the inorganic shell 5. The inner wall of the metal shell 2 and the outer wall of the inorganic shell 5 define a hollow ring 3. This embodiment prevents the use of a transition shell such as $SiO_2$ in the prior art to ensure a spacing between the quantum dot core and the metal shell; prevents the ligand modification of quantum dots, thereby preventing reduction of fluorescence efficiency of the quantum dot 100, thus maintaining an original light conversion efficiency of the quantum dot 100.

The quantum dot 100 of this embodiment can be modified with ligand to its metal shell 2, so that more subsequent processing can be performed on the quantum dot 100. The subsequent manufacturing process has no effect on the quantum dot core 1, which can ensure that the optical properties of the quantum dot 100 are not destroyed while enriching applicability the quantum dot 100.

Figure 5:
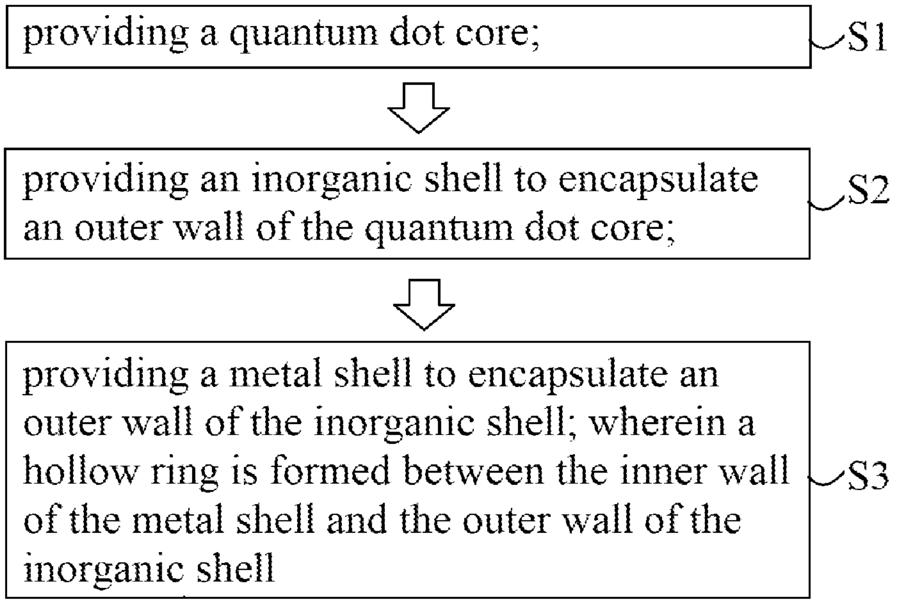
FIG. 5 is a flow chart of steps of preparing the quantum dot according to Embodiment 2 of the present invention.

As shown in FIG. 5, this embodiment also provides a method of preparing the quantum dot 100, which includes the following steps: S1, providing a quantum dot core 1; S2, providing an inorganic shell 5 to encapsulate an outer wall of the quantum dot core 1; and S3, providing a metal shell 2 to encapsulate an outer wall of the inorganic shell 5; wherein a hollow ring 3 is formed between the inner wall of the metal shell 2 and the outer wall of the inorganic shell 5.

The step S2 includes: adding the quantum dot core 1 with a content of cations of 0.01 mmol to 0.05 mmol and the inorganic shell 5 coated on the outer wall of the quantum dot core 1, and 15 ml-25 ml of the first solution into a first container, vacuuming the first container at a temperature of 70° C.-90° C., and then adding an inert gas into the first container, followed by stirring to form a uniform second solution; heating the first container to 300° C.-350° C., adding 0.5 ml-5 ml of a third solution with a content of first metal ions of 0.005 mmol to 0.05 mmol to the first container at a speed of 0.03 ml/s-0.05 ml/s for reaction for 3 min to 5 min, cooling the first container to room temperature, and performing a first purification treatment to obtain a first extract; adding 15 ml-30 ml of a fourth solution to the first extract, followed by stirring at room temperature for 3 min-8 min; and adding 0.5 ml-5 ml of a fifth solution with a content of second metal ions of 0.005 mmol-0.06 mmol to the first extract at a speed of 0.3 ml/s-0.5 ml/s, followed by stirring at room temperature, subjecting the first metal ions and the second metal ions to a substitution reaction, followed by stirring for 5 min-10 min, and performing a second purification treatment to obtain a second extract, so that the outer wall of the quantum dot core 1 is encapsulated by a metal layer to form the metal shell 2, to define the hollow ring 3 between the inner wall of the metal shell 2 and the outer wall of the inorganic shell 5.

The first solution includes one or more of organic amines, organic acids, trioctyl phosphorus, alkanes with a boiling point higher than 300° C., and alkenes with a boiling point higher than 300° C.

The organic amines include octylamine, dodecylamine, and organic amines with a boiling point higher than 300° C. The organic amines with a boiling point higher than 300° C. include: linear alkyl amines with not less than 16 carbon atoms (hexadecylamine, stearylamine, eicosamine), and linear alkenyl amines with not less than 16 carbon atoms (oleylamine, eicoseneamine, etc.).

The organic acids include oleic acid, octadecanoic acid, and the like.

The alkanes with a boiling point higher than 300° C. include straight-chain alkanes with not less than 18 carbon atoms, and straight-chain alkanes with not less than 25 carbon atoms (squalane, etc.). When the first solution uses alkane with a boiling point higher than 300° C., it needs to be used in conjunction with 3 ml-10 ml of organic amines.

The olefins with a boiling point higher than 300° C. include linear olefins (octadecene, octadecane). When the first solution uses an olefin with a boiling point higher than 300° C., it needs to be used in conjunction with 3 ml-10 ml of organic amines.

Each of the third solution and the fourth solution includes one of oleylamine, toluene, DMF, and organic amines with a boiling point higher than 300° C.

Each of the fourth solution and the fifth solution further includes cetyl trimethyl ammonium bromide, and a concentration of the cetyl trimethyl ammonium bromide in the fourth solution ranges from 0.02 mmol/ml to 0.08 mmol/ml.

An activity of the first metal ions is greater than an activity of the second metal ion; a content of the second metal ions in the fifth solution is greater than a content of the first metal ions in the third solution content. Preferably, a content of the second metal ions in the fifth solution is 1-1.2 times the content of the first metal ions in the third solution.

In this embodiment, the step S3 includes: adding the quantum dot core 1 with a content of cations ($Cd_2$+) of 0.025 mmol and the inorganic shell 5 coated the outer wall of the quantum dot core 1, and 20 ml of the first solution (a mixture of 19 ml of octadecylamine and 1 ml of TOP) into a three-necked flask, vacuuming the first container at a temperature of 80° C., and then adding an inert gas (N2) into the three-necked flask, followed by stirring to form a uniform second solution; heating the first container to 300° C., adding 2 ml of the third solution (a mixed solution of CuCl and oleylamine) with a content of first metal ions (Cu+) of 0.02 mmol to the three-necked flask at a speed of 0.035 ml/s for reaction for 4 min, cooling the three-necked flask to room temperature, and performing a first purification treatment to obtain a first extract.

It should be noted that the third solution (a mixed solution of CuCl and oleylamine) needs to be injected slowly at high temperature, otherwise there will be a side reaction of formation of individual Cu particles, which will impact the Cu shell coating on the periphery of the quantum dot core.

Figure 6:
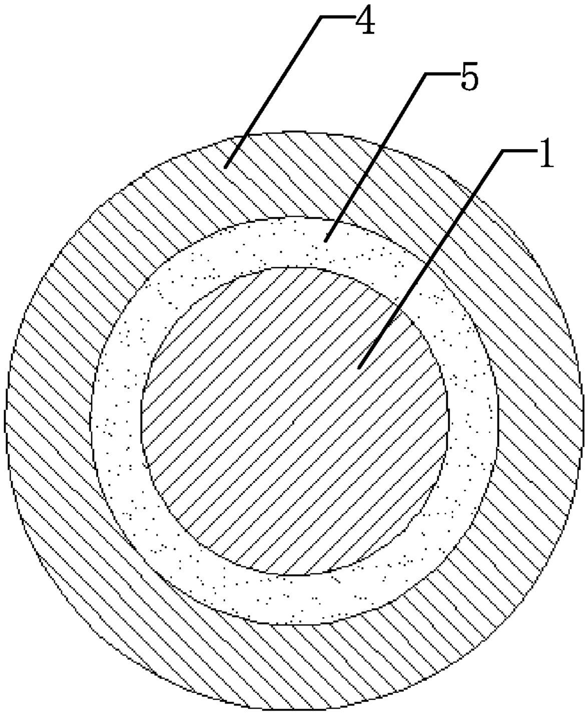
FIG. 6 is a schematic structural diagram of a quantum dot core encapsulated by an inorganic shell and the inorganic shell encapsulated by a metal transition shell according to Embodiment 2 of the present invention.

As shown in FIG. 6, the first purification treatment includes: transferring the Cu-coated reaction solution to a separatory funnel, adding 5 ml of n-hexane; after mixing uniformly, gradually adding excess methanol to disperse particles at an upper layer of n-hexane, wherein colorless methanol mixtures are present at a lower layer of n-hexane; after removing the methanol at the lower layer of n-hexane, adding excess methanol again, repeating the above processes 3 times, transferring the upper layer of n-hexane to a centrifuge tube, and adding excess acetone (a volume ratio of acetone to n-hexane is 3:7), and a turbid liquid appears after fully mixing; centrifuging at 4500 rpm for 10 min, removing the supernatant, thus obtaining a particle precipitate of the inorganic shell 5 coated on a periphery of the quantum dot core 1, and the metal transition shell 4 coated on a periphery of the inorganic shell 5. Specifically, the metal transition shell 4 is a Cu shell, and the particles are QDCu particles.

In this embodiment, the step S3 also includes: adding 25 ml of the fourth solution (a mixed solution of CTAB and oleylamine, where the concentration of CTAB is 0.05 mmol/ml) to the first extract, followed by stirring at room temperature for 5 min; and adding 2 ml of the fifth solution (a mixture of AgCl and CTAB) with a content of second metal ions of 0.02 mmol to the first extract at a speed of 0.4 ml/s, followed by stirring at room temperature, subjecting the first metal ions (Cu+) and the second metal ions (Ag+) to a substitution reaction, followed by stirring for 10 min, and performing a second purification treatment to obtain a second extract, so that the outer wall of the inorganic shell 5 is coated with a metal layer to form a metal shell 2, and a hollow ring 3 is formed between the inner wall of the metal shell 2 and the outer wall of the inorganic shell 5.

It should be noted that the fifth solution (a mixture of AgCl and CTAB) needs to be injected quickly at room temperature. At this time, the temperature is low and Ag particles will not be formed alone. The rapid injection is beneficial to the formation of the hollow ring 3.

As shown in FIG. 4, the second purification treatment includes: transferring the Ag-coated reaction solution to a centrifuge tube, and centrifuging at a centrifuge speed of 9000 rpm for 10 minutes to obtain an inorganic shell 5 coated on the periphery of the quantum dot core 1. The metal shell 2 is coated on the periphery of the inorganic shell 5, and the inner wall of the metal shell 2 and the outer wall of the inorganic shell 5 form the precipitation particles of the hollow ring 3. In other embodiments, a small amount of acetone can be added in the second purification process to assist the purification process.

The principle of the Kirkendall effect is that two metals with different diffusion rates will form defects during their diffusion process, which is very typical in a substitution process. During the reaction, the inner layer metal continues to diffuse to the outer layer, and a total number of lattice points remains unchanged, and every plane in the diffusion area must move.

In this embodiment, cuprous chloride (CuCl) is used as a reactant, and a layer of a Cu shell is coated on the inorganic shell 5 as the metal transition shell 4; the metal substitution reaction is carried out with AgCl as a reactant and CTAB as an auxiliary ligand, a small amount of octylamine is added, with the Cu shell used as a template, the Kirkendall effect is utilized to form the metal shell 2 and the hollow ring 3 between the inner wall of the metal shell 2 and the outer wall of the inorganic shell 5. A diameter of the outer wall of the hollow ring 3 is related to the diameter of the outer wall of the Cu shell. Ag and Cu are substituted one-to-one, and the amounts of substances are the same, so that the thickness of the formed metal shell 2 is related to the Cu content.

Principle of metal surface plasmon resonance enhanced QD fluorescence is that: a density of an electron cloud on the metal surface is relatively large, and when the light is transmitted to a surface of the metal ion, it resonates with the electron cloud, and a secondary energy can be transferred to a quantum dot material, which is absorbed by the quantum dot and converted into fluorescence of a specific wavelength, wherein a fluorescence color is related to a band gap of the quantum dot itself, which will not change a fluorescence emission wavelength of the quantum dot itself, but will increase light absorption efficiency, so that under excitation of the same blue light intensity, a conversion brightness of QDAg is greatly improved. Such an enhancement effect of this phenomenon is related to a diameter of the outer wall of the metal shell 2 and a distance between the inner wall of the metal shell 2 and the outer wall of the inorganic shell 5. The diameter of the outer wall of the metal shell 2 affects a wavelength of the excitation light absorbed by the metal shell. Therefore, in this embodiment, it is preferred that a characteristic absorption peak of the Ag metal shell is at 430-500 nm, and the diameter of the outer wall of the metal shell 2 ranges from 100 nm to 150 nm. The distance between the inner wall of the metal shell 2 and the outer wall of t the inorganic shell 5 affects the fluorescence enhancement characteristics, and the distance between the inner wall of the metal shell 2 and the outer wall of the inorganic shell 5 ranges from 10-5 nm.

This embodiment utilizes the Kirkendall effect to coat an inorganic shell 5 on the periphery of the quantum dot core 1, and the inner wall of the metal shell 2 and the outer wall of the inorganic shell 5 define a hollow ring 3. This embodiment prevents the use of a transition shell such as $SiO_2$ in the prior art to ensure a spacing between the quantum dot core and the metal shell; prevents the ligand modification of quantum dots, thereby preventing reduction of fluorescence efficiency of the quantum dot 100, thus maintaining an original light conversion efficiency of the quantum dot 100.

The quantum dot 100 of this embodiment can be modified with ligand to its metal shell 2, so that more subsequent processing can be performed on the quantum dot 100. The subsequent manufacturing process has no effect on the quantum dot core 1, which can ensure that the optical properties of the quantum dot 100 are not destroyed while enriching applicability the quantum dot 100.

The quantum dot, the preparation method thereof, and the quantum dot film provided by the present application are described in detail above. Specific examples are used to explain the principle and implementation of the present application. The descriptions of the above embodiments are only used to help understand the present application. Also, for those skilled in the art, according to the ideas of the present application, there will be changes in the specific implementation and application scope. In summary, the content of this specification should not be construed as limiting the present application.

What is claimed is:

1. A quantum dot, comprising:

a quantum dot core of semiconductor; and a metal shell encapsulating the quantum dot core, wherein a hollow ring is provided between an inner wall of the metal shell and an outer wall of the quantum dot core.

2. The quantum dot according to claim 1, wherein a diameter of the outer wall of the metal shell ranges from 100 nm to 150 nm.

3. The quantum dot according to claim 1, wherein a thickness of the hollow ring ranges from 10 nm to 50 nm.

4. The quantum dot according to claim 1, further comprising:

an inorganic shell disposed between the quantum dot core and the hollow ring.

5. A method of preparing quantum dots, comprising the following steps:

providing a quantum dot core made of semiconductor; and providing a metal shell to encapsulate an outer wall of the quantum dot core, wherein a hollow ring is formed between an inner wall of the metal shell and the outer wall of the quantum dot core.

6. The method of preparing quantum dots according to claim 5, wherein the step of providing the metal shell to encapsulate the outer wall of the quantum dot core comprises:

adding the quantum dot core and a first solution into a first container, vacuuming the first container, and then adding an inert gas into the first container, followed by stirring to form a uniform second solution;

heating the first container, adding a third solution containing first metal ions to the first container for reaction, cooling the first container, and performing a first purification treatment to obtain a first extract;

adding a fourth solution to the first extract, followed by stirring; and adding a fifth solution containing second metal ions to the first extract, followed by stirring, subjecting the first metal ions and the second metal ions to a substitution reaction, followed by stirring, and performing a second purification treatment to obtain a second extract, so that the outer wall of the quantum dot core is encapsulated by a metal layer to form the metal shell, to define the hollow ring between the inner wall of the metal shell and the outer wall of the quantum dot core.

7. The method of preparing quantum dots according to claim 6, wherein the first solution comprises one or more of organic amines, organic acids, trioctyl phosphorus, alkanes with a boiling point higher than 300° C., and alkenes with a boiling point higher than 300° C.

8. The method of preparing quantum dots according to claim 6, wherein each of the third solution and the fourth solution comprises one of oleylamine, toluene, DMF, and organic amines with a boiling point higher than 300° C.

9. The method of preparing quantum dots according to claim 8, wherein each of the fourth solution and the fifth solution further comprises cetyltrimethylammonium bromide, and a concentration of the cetyltrimethylammonium bromide in the fourth solution ranges from 0.02 mmol/mL to 0.08 mmol/mL.

10. The method of preparing quantum dots according to claim 6, wherein an activity of the first metal ions is greater than an activity of the second metal ions; and a content of the second metal ions in the fifth solution is greater than a content of the first metal ions in the third solution.

11. A quantum dot film, comprising quantum dots, and the quantum dots comprising:

a quantum dot core of semiconductor; and a metal shell encapsulating the quantum dot core, wherein a hollow ring is provided between an inner wall of the metal shell and an outer wall of the quantum dot core.

12. The quantum dot film according to claim 11, wherein a diameter of the outer wall of the metal shell ranges from 100 nm to 150 nm.

13. The quantum dot film according to claim 11, wherein a thickness of the hollow ring ranges from 10 nm to 50 nm.

14. The quantum dot film according to claim 11, further comprising:

an inorganic shell disposed between the quantum dot core and the hollow ring.

* * * * *